June 4, 1957  M. D. McCARTY  2,794,966
SELECTIVE MIXING OF SEISMIC SIGNALS
Filed Aug. 28, 1953  2 Sheets-Sheet 1

MALCOLM D. McCARTY
INVENTOR.

BY D. Carl Richards
ATTORNEY

MALCOLM D. McCARTY
INVENTOR.

BY D. Carl Richards
ATTORNEY

United States Patent Office 2,794,966
Patented June 4, 1957

2,794,966
SELECTIVE MIXING OF SEISMIC SIGNALS

Malcolm D. McCarty, Dallas, Tex., assignor, by mesne assignments, to Socony Mobil Oil Company, Inc., a corporation of New York Application August 28, 1953, Serial No. 377,200

8 Claims. (Cl. 340—15)

This invention relates to seismic exploration and more particularly to the selective treatment of a plurality of seismic signals in order to more clearly define the character of selected components of the seismic energy.

Many expedients have been resorted to in the past to aid production of seismic records susceptible of more positive interpretation. In troublesome seismic areas large numbers of detectors have been utilized in an effort to increase a desired signal to noise ratio. Various shot-detector arrays as well as many other methods have also been employed.

The present invention broadly relates to the same problem but permits a more ready and flexible approach to seismic analysis than prior art systems while retaining many of the advantages of such prior art systems.

In accordance with an important aspect of the present invention, a plurality of seismic signals are sampled or mixed at a rate that is high compared to the frequency of components of the seismic signals for application to a single circuit of a composited seismic signal. With components of the signal corresponding to the sampling or mixing rate highly attenuated, the composited signal may then be recorded as to clearly present desirable features of the seismic signals in contrast to undesired properties thereof.

In a more specific aspect of the invention there is provided a system for applying to a recorder electrical signals which correspond with earth movements and including a plurality of sources for producing electrical signals corresponding with earth movement at a plurality of points in the field of influence of the seismic explosion. A signal channel is provided for transmission of the electrical signals to the recorder and includes a means for sampling each of the electrical signals successively and cyclically at a controlled rate which is high compared to the frequency of the signals to produce a composite signal. The signal channel further includes a filter intermediate the sampling means and the recorder for attenuating components of the composited signal introduced by the sampling action so that the composited signal may be recorded to present selected seismic components more clearly than otherwise may be possible.

In a still more specific aspect of the invention the sampling rate is varied as a function of record time for optimum compositing at each instant throughout the existence of a given seismic event.

For further objects and advantages of the present invention, reference may now be had to the following description taken in conjunction with the accompanying drawings in which:

Fig. 1 diagrammatically illustrates commutator means for selectively mixing a plurality of seismic signals;

Figure 1:
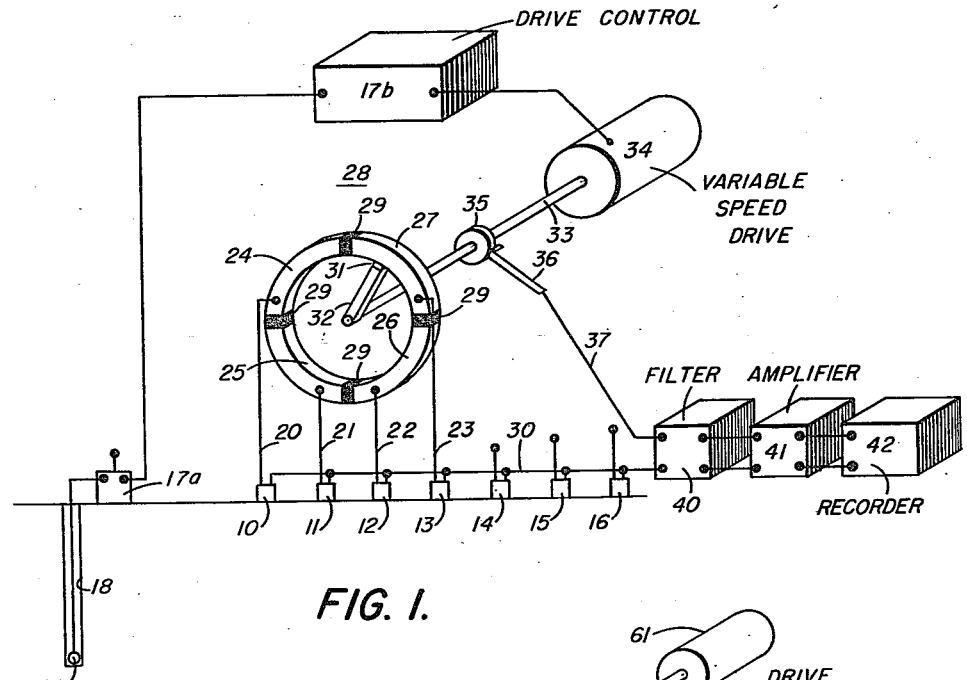

Referring now to Fig. 1, a plurality of geophones 10–16 are positioned at selected locations in the field of influence of the seismic energy produced upon detonation of an explosive charge 17 located at the bottom of a shot hole 18. The relative orientation of the geophones 10–16 to shot hole 18 may be varied to produce best results in particular circumstances as will hereinafter be pointed out. However, for the purpose of illustrating the invention, it will be assumed that geophones are positioned at successively increasing distances from hole 18 on a radius extending from hole 18 along the surface of the earth. The first four geophones, 10–13, respectively, are connected by way of conductors 20, 21, 22 and 23 to separate segments 24, 25, 26 and 27 of a commutator 28. Each of the segments of the commutator 28 is electrically isolated from adjacent segments as by insulating elements 29. The second terminal of each of the geophones 10–13 is connected to a common conductor 30. A brush 31 is supported in contact with the commutator elements at the end of an arm 32 which is fixedly secured to and rotated with a shaft 33 coupled to or otherwise driven by a variable speed drive motor 34. As the shaft 33 is rotated, samples of the signals from geophones 10–13 are collected in sequence and in repeated cycles thereby to composite the separate signals from geophones 10–13. In the system illustrated, the arm 32 is electrically common to the shaft 33 and a slip-ring 35 although it is obvious that a separate circuit may be provided. A brush 36 and conductor 37 serve to conduct the composited signal to the input of filter 40. Common conductor 30 is also connected to filter 40.

Preferably the rate of sampling, or the frequency of rotation of shaft 33, is high compared to the frequency of the components of the signals from geophones or seismometers 10–13. The difference between the speed of rotation of shaft 33 and the signals from geophones 10–13 should be in the order of at least an octave and preferably several octaves. Further, in accordance with one aspect of the invention, the sampling rate is varied as a function of time following detonation of the explosion 17 to produce optimum sampling or mixing of the several seismic signals at all instants within the time duration of the seismic event produced by such detonation. One manner of controlling the sampling rate is to utilize the time break impulse from blaster 17a to energize the drive or trigger control unit 17b which may produce, in response to the time break impulse, a control function for drive motor 34. The control function may cause the speed of motor 34 to change linearly with time, for example, from a relatively high speed to a much lower speed generally in accordance with or conforming to variations in the dominant frequency of the seismic energy received at the different points along the record. Alternatively the control function for drive motor 34 may change step-wise, abruptly shifting the speed of motor 34 at one or more points within the time duration of the seismic event.

A filter 40 is then provided in the output circuit of the compositing means to highly attenuate and preferably eliminate from the composited signal components whose frequency corresponds with the frequency of rotation of the shaft 33. Thus there is produced in an output circuit a seismic signal which is then amplified by amplifier 41 for application to a recorder 42. The seismic signal thus produced may embody directionally selective characteristics or signal to noise components as a result of the compositing not present in a signal from a single geophone. The compositing rate may be varied or the compositing means operated at a selected rate to enhance signal to noise ratios in a manner less complicated than other systems. It will be apparent that the relatively simple system of Fig. 1 utilizing only four signals is to be taken as illustrative only and not by way of limitation since any desired number of seismic signals in any selected sequence may be similarly composited to produce a desired signal for ultimate recording.

For example, the signals from geophones 14–16 may be added to the signals from geophones 10–13 by the provision of a commutator with sufficient segments to accommodate all seven signals in a manner the same as above described. Alternatively, if desired, the signals from geophones 10–13 may be mixed to produce a first output signal, the signals from geophones 11–14 may be mixed through an additional commutator to produce a second output signal, the signals from geophones 12–15 to produce a third output signal and so forth. For certain geophone arrays it may be advantageous to mix signals in other types of sequences, for example to produce a first signal, geophones 10, 12 and 14 may be mixed and to produce a second signal geophones 11, 13 and 15 may be mixed. These and other variations may be employed for the production of new and useful seismograms.

It will be recognized that an important feature of the invention is the provision of the successive and sequential sampling of a plurality of signals at a rate high compared to the frequency components of the signals and then the attenuation of components that may be introduced merely by reason of the compositing action itself.

Figure 2:
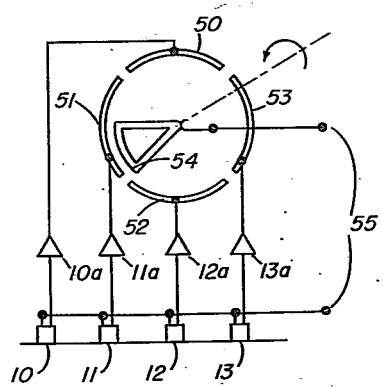
Fig. 2 illustrates a capacitor type mixer.

While in Fig. 1 a mechanical conductive type commutator has been illustrated, it will now be apparent that other systems may be used. In Fig. 2 a capacitor type commutator has been shown in which signals from geophones 10–13 are applied to condenser plates 50–53, respectively. A single rotating commutator plate 54 is provided and is rotatable in a manner similar to brush 31 of Fig. 1 to produce in an output circuit 55 a composited signal for ultimate recording. The channels leading from the geophones 10–13 to the commutator segments 50–53 may include amplifiers and/or selective networks such as units 10a–13a.

Figure 3:
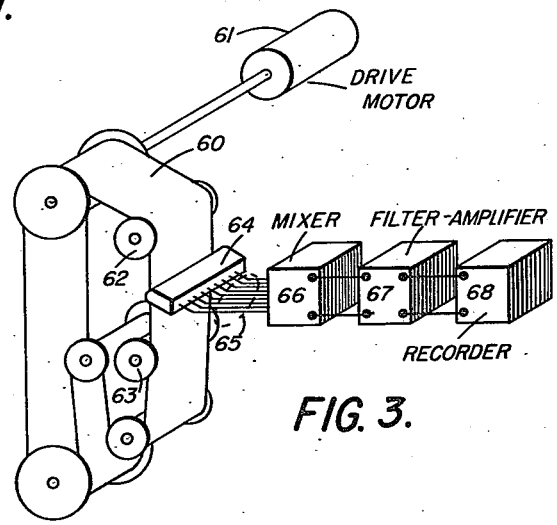
Fig. 3 illustrates application of the invention to seismic signals recorded in phonographically reproducible form.

It should further be noted that the invention is not limited to the reception and treatment of signals directly from a seismometer but is directly applicable to systems in which phonographically reproducible records are utilized. More particularly as shown in Fig. 3, a plurality of seismic signals initially recorded on a magnetic tape 60 may be driven from a motor 61 over a series of guide pulleys or rollers including rollers 62 and 63 past a pickup head 64 to produce in the output channels 65 a plurality of signals which correspond with the original outputs of seismic detectors utilized in the initial recording. Such signals may then be applied to mixer or compositor 66 of the type shown either in Fig. 1 or Fig. 2. The output of the compositor may then be applied to a filter-amplifier unit 67 and thence to a recorder 68 to produce a record of the type above discussed. The signals on channels 65 may be selected for mixing in such sequences as will enhance the signal to noise ratio or incorporate into the final recording a directional property better to delineate the character of earth formations producing the seismic effects detected by the original geophones.

Figure 4:
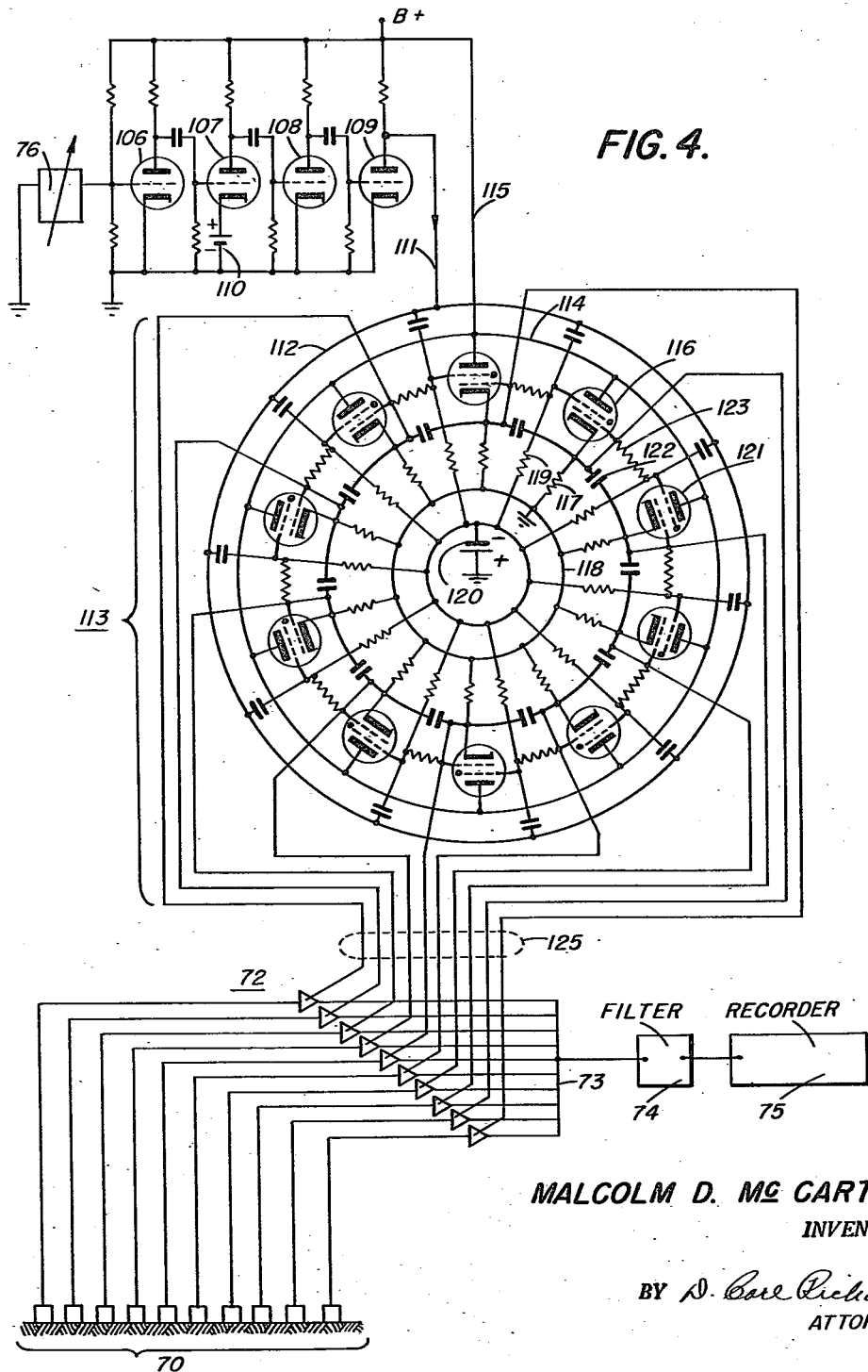
Fig. 4 is a schematic diagram of an electronic mixer system.

Referring now to Fig. 4, there is illustrated a system for receiving seismic signals from a plurality of seismic detectors arranged in a spread 70 which may be in the form of a grid or in any predetermined pattern. For each geophone there is provided an amplifier in an amplifier bank 72. The outputs of all of the amplifiers in bank 72 are applied to a common bus 73 and thence to a filter 74 and a recorder 75. As above described in connection with Figs. 1 and 2, signals from the geophones are composited or mixed for ultimate recording. In the system of Fig. 4, however, compositing or mixing is accomplished by gating the amplifiers in bank 72 at a rate controlled by a selectively variable frequency oscillator 76. While the system here shown includes the detectors in spread 70, it will be appreciated that seismic signals from a phonographically reproducible record may be mixed in the same manner.

The signal from oscillator 76, preferably a high frequency, is transmitted successively through tubes 106, 107, 108 and 109. In passing through the channel including tubes 106–109 the signal is clipped and differentiated, producing both a positive and a negative voltage spike for each cycle thereof.

By operation of tube 107 with the battery 110 in the cathode circuit thereof, the negative peaks are removed so that at the anode of tube 109 and thus on output conductor 111 positively polarized unidirectional pulses appear at a rate equal to the frequency of the oscillator 76.

Pulses on conductor 111 are applied to the input bus 112 of a transfer conduction ring 113. In the form illustrated, conduction ring 113 comprises ten thyratrons each of which has its anode connected to a common bus 114 which is fed by the way of conductor 115 from the B+ source for tubes 106–109. The circuits for the thyratrons are identical. For example the cathode of tube 116 is connected by way of a resistor 117 to a ground bus 118 to complete the circuit for anode-cathode current. The circuit and its operation are similar to that described in "Wave Forms," M. I. T. Radiation Laboratory Series, volume 19, McGraw-Hill Books Incorporated, 1949, particularly the descriptive portion appearing at page 612 and the circuit illustrated in Fig. 17.10. The shield grid of tube 116 is connected by way of a resistor 119 to a central point which is maintained slightly negative with respect to ground by means of a battery 120. The cathode of tube 116 is connected to the cathode of tube 121 by coupling condenser 122. Also, the cathode of tube 116 is connected to its control grid and then, by way of intermediate resistor 123, to the shield of the next tube in the circuit.

In operation in response to repeated pulses on bus 112 as from source 76 conduction is transferred from one tube to another around the ring. Accompanying such conduction transfer are step-wise changes in the voltage levels on the cathode and on the control grid of each tube. Such step-wise changes are transmitted by conductors 125 to the amplifiers in bank 72. In operation, normally all of the amplifiers in bank 72 are maintained non-conductive. Under the control of the circuit 113 only one amplifier is rendered conductive at any one time with conduction shifting cyclically from one amplifier to another corresponding to the shift in conduction in the tubes of ring 113.

The oscillator 76 is above indicated as variable in frequency. This is to be taken to mean that for any single operation the frequency of the signal from oscillator 76 may be adjusted to a predetermined value for optimum mixing of a particular record. It may further be taken to mean that the signal from the oscillator 76 may be varied within the time duration of the seismic event in the manner above discussed in connection with Fig. 1 whereby the time break from blaster 17a, Fig. 1, is utilized to excite a control unit 17b for the production of a control function. Such control function may be utilized in the manner well known by those skilled in the art to vary the frequency of the oscillator 76 as a function of time.

While the invention has been illustrated and described as embodied in the several modifications shown in the drawings, it will be understood that further modifications may now suggest themselves to those skilled in the art. The invention contemplates the improvement in record character whether signals be taken from detectors positioned on a line with respect to the shot or in a grid or other array or from a prior recording of seismic signals. The selective sampling and mixing may be utilized to improve record quality as an aid in the analysis of the character of the subsurface structure. It is hereby intended to cover such systems and methods within the scope of the appended claims.

What is claimed is:

1. The method of recording seismic signals which comprises repeatedly sampling a plurality of individual seismic signals at a rate high compared to the frequency of the components of said seismic signals to produce a composite signal, filtering from said composite signal frequency components corresponding with the rate of sampling, and recording the filtered composite signal.

2. The method of recording seismic signals which comprises repeatedly sampling a plurality of individual seismic signals at a rate high compared to the frequency of the components of said seismic signals to produce a composite signal, varying said rate as a predetermined function of time with reference to the initiation of said signals, filtering from said composite signal frequency components corresponding with the rate of said sampling, and recording the filtered composite signal.

3. A seismic recording system which comprises means for repeatedly and cyclically sampling and mixing components of a plurality of individual seismic signals at a rate which is high compared to the frequency of components of said individual signals, and a common circuit for receiving the composite mixture of said seismic signals including a recorder and filter means intermediate said recorder and said sampling and mixing means for attenuating components of said composite mixture corresponding with said rate.

4. A system for recording seismic signals corresponding with components of earth motion at a plurality of different points in the field of influence of a seismic explosion which comprises a recorder and a signal channel connected at its output to said recorder and responsive at its input to said plurality of signals representative of said earth motion and including means for sampling each of said seismic signals in a predetermined sequence at a rate high compared to the frequency components of said signals, a common circuit in said channel for compositing the successive samplings of said signals, and filter means in said channel intermediate said recorder and said sampling means for substantially attenuating frequency components corresponding with the sampling rate.

5. In a seismic surveying system having a recorder for producing a record of electrical signals corresponding with earth movement in the field of influence of a seismic explosion, the combination of a plurality of seismic detectors positioned at selected locations in said field of influence, signal channel means interconnecting said detectors and said recorder and including means for sampling the signals from said plurality of detectors successively and cyclically at a rate which is high compared to the frequency of signals from said detectors to composite said signals, and a filter intermediate said last named means and said recorder for attenuating components of the composited signal of the frequency of said sampling rate.

6. In a seismic surveying system having a recorder for producing a record of selected electrical signals corresponding with earth movement in the field of influence of a seismic explosion, the combination of a plurality of seismic detectors positioned at selected locations in said field of influence, signal channel means interconnecting said detectors and said recorder and including means for sampling the signals from said plurality of detectors successively and cyclically at a rate which is high compared to the frequency of signals from said detectors and which varies in a predetermined manner within the time duration of said electrical signals, and a filter intermediate said last named means and said recorder for attenuating components of the composited signal of the frequency of said sampling rate.

7. A system for recording seismic signals corresponding with components of earth motion at a plurality of different points in the field of influence of a seismic explosion which comprises a recorder and a signal channel connected at its output to said recorder and responsive at its input to said plurality of signals representative of said earth motion and including means for sampling each of said signals in a predetermined sequence at a rate high compared to the frequency components of said signals, a common circuit in said channel for compositing the successive samplings of said signals, means for varying said rate of sampling as a predetermined function of time during the existence of said signals, and filter means in said channel intermediate said recorder and said sampling means for eliminating frequency components corresponding with said rate of sampling.

8. The method of recording seismic signals which comprises sampling repeatedly within their time duration a plurality of individual seismic signals where the sampling rate is high compared to the frequency of the components of said seismic signals, combining the samplings thereof to produce a composite signal, filtering from said composite signal the frequency components thereof which correspond with the rate of sampling, and recording the filtered composite signal.

References Cited in the file of this patent

UNITED STATES PATENTS

| 2,348,409 | Parr | May 9, 1944 |
| 2,378,383 | Arndt | June 19, 1945 |
| 2,578,133 | Hawkins | Dec. 11, 1951 |
| 2,628,689 | Rieber | Feb. 17, 1953 |